United States Patent
Weir et al.

(10) Patent No.: US 6,433,058 B1
(45) Date of Patent: Aug. 13, 2002

(54) SUPERABSORBENT POLYMERS HAVING A SLOW RATE OF ABSORPTION

(75) Inventors: Joseph L. Weir, Midland; Larry R. Wilson, Beaverton, both of MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/455,927

(22) Filed: Dec. 7, 1999

(51) Int. Cl.$^7$ ................................................. C08K 3/18
(52) U.S. Cl. ........................ 524/431; 523/105; 523/111; 524/433; 524/437; 524/459; 524/460; 524/523; 524/527
(58) Field of Search .................... 523/105, 111; 524/523, 527, 431, 433, 437, 459, 460; 604/358, 365, 366, 367, 375

(56) References Cited

U.S. PATENT DOCUMENTS

| | | | |
|---|---|---|---|
| 3,669,103 A | 6/1972 | Harper et al. ............. 128/156 |
| 3,670,731 A | 6/1972 | Harmon .................... 128/284 |
| 3,926,891 A | 12/1975 | Gross et al. ............. 260/29.6 |
| 3,935,099 A | 1/1976 | Weaver et al. ............... 210/43 |
| 3,997,484 A | 12/1976 | Weaver et al. ............. 260/17.4 |
| 4,043,952 A | 8/1977 | Ganslaw et al. ........ 260/17.4 ST |
| 4,076,663 A | 2/1978 | Masuda et al. ........... 260/17.4 |
| 4,090,013 A | 5/1978 | Ganslaw et al. ............. 526/15 |
| 4,093,776 A | 6/1978 | Aoki et al. ................. 428/402 |
| 4,127,944 A * | 12/1978 | Giacobello ..................... 34/9 |
| 4,190,562 A | 2/1980 | Westerman ............... 260/17.4 |
| 4,286,082 A | 8/1981 | Tsubakimoto et al. ...... 526/240 |
| 4,338,371 A | 7/1982 | Dawn et al. ............... 428/283 |
| 4,340,706 A | 7/1982 | Obayashi et al. .......... 526/207 |
| 4,354,901 A | 10/1982 | Kopolow .................... 162/158 |
| 4,430,086 A | 2/1984 | Repke ........................ 604/385 |
| 4,446,261 A | 5/1984 | Yamasaki et al. ............ 524/40 |
| 4,447,364 A | 5/1984 | Staal ...................... 260/448 R |
| 4,459,396 A | 7/1984 | Yamasaki et al. .......... 526/200 |
| 4,500,315 A | 2/1985 | Pieniak et al. ............. 604/379 |
| 4,537,590 A | 8/1985 | Pieniak et al. ............. 604/379 |
| 4,548,847 A | 10/1985 | Aberson et al. ............. 428/74 |
| 4,596,567 A | 6/1986 | Iskra ......................... 604/368 |
| 4,610,678 A | 9/1986 | Weisman et al. ........... 604/368 |
| 4,654,039 A | 3/1987 | Brandt et al. .............. 604/368 |
| 4,666,983 A | 5/1987 | Tsubakimoto et al. ...... 525/119 |
| 4,673,402 A | 6/1987 | Weisman et al. ........... 604/368 |
| 4,676,784 A | 6/1987 | Erdman et al. ............. 604/368 |
| 4,683,274 A | 7/1987 | Nakamura et al. .......... 526/216 |
| 4,693,713 A | 9/1987 | Chmelir et al. ............ 604/368 |
| 4,708,997 A | 11/1987 | Stanley et al. ............. 526/207 |
| 4,734,478 A | 3/1988 | Tsubakimoto et al. ...... 527/300 |
| 4,798,603 A | 1/1989 | Meyer et al. ............... 604/378 |
| 4,857,610 A | 8/1989 | Chmelir et al. ............. 526/88 |
| 4,892,598 A | 1/1990 | Stevens et al. ............. 156/91 |
| 4,935,022 A | 6/1990 | Lash et al. ................. 604/368 |
| 4,938,756 A | 7/1990 | Salek ........................ 604/368 |
| 4,954,562 A | 9/1990 | Anderson .................... 524/779 |
| 4,973,325 A | 11/1990 | Sherrod et al. ............. 604/368 |
| 4,985,518 A | 1/1991 | Alexander et al. .......... 526/240 |
| 4,986,882 A | 1/1991 | Mackey et al. ............. 162/109 |
| 4,990,541 A | 2/1991 | Nielsen et al. ................ 521/70 |
| 5,002,986 A | 3/1991 | Fujiura et al. ................ 524/47 |
| 5,061,259 A | 10/1991 | Goldman et al. ........... 604/368 |
| 5,115,011 A | 5/1992 | Harada et al. .............. 524/419 |
| 5,145,906 A | 9/1992 | Chambers et al. .......... 524/732 |
| 5,147,343 A | 9/1992 | Kellenberger .............. 604/368 |
| 5,149,335 A | 9/1992 | Kellenberger et al. ...... 604/372 |
| 5,300,192 A | 4/1994 | Hansen et al. ................ 524/13 |
| 5,308,896 A | 5/1994 | Hansen et al. ................ 524/13 |
| 5,364,382 A | 11/1994 | Latimer et al. ............. 604/378 |
| 5,429,629 A | 7/1995 | Latimer et al. ............. 604/378 |
| 5,447,727 A | 9/1995 | Graham ..................... 424/487 |
| 5,486,166 A | 1/1996 | Bishop et al. ................ 60/366 |
| 5,520,673 A | 5/1996 | Yarbrough et al. ......... 604/378 |
| 5,531,728 A | 7/1996 | Lash ......................... 604/378 |
| 5,538,783 A | 7/1996 | Hansen et al. .............. 428/283 |
| 5,543,215 A | 8/1996 | Hansen et al. .............. 428/283 |
| 5,562,646 A | 10/1996 | Goldman et al. ........... 604/368 |
| 5,578,318 A | 11/1996 | Honeycutt .................. 424/443 |
| 5,651,862 A | 7/1997 | Anderson et al. ........... 162/127 |
| 5,728,082 A | 3/1998 | Gustafsson et al. ......... 604/368 |
| 5,744,564 A | 4/1998 | Stanley, Jr. et al. ...... 526/317.1 |
| 5,795,439 A | 8/1998 | Euripides et al. ........... 162/100 |
| 5,800,418 A * | 9/1998 | Ahr ........................... 604/368 |
| 5,855,571 A | 1/1999 | Steger et al. ............... 604/368 |
| 5,883,158 A | 3/1999 | Nambu et al. .............. 523/412 |

FOREIGN PATENT DOCUMENTS

| | | |
|---|---|---|
| EP | 0 316 518 A2 | 5/1989 |
| EP | 0 631 768 A1 | 4/1998 |
| GB | 2 280 115 A | 1/1995 |
| WO | WO-91/05108 A * | 4/1991 |
| WO | WO 98/49221 | 11/1998 |

OTHER PUBLICATIONS

F.L. Buchholz et al.; "Modern Superabsorbent Polymer Technology," (1998) p. 153.
F.L. Buchholz et al.; "Modern Superabsorbent Polymer Technology," (1998) pp. 57–58.

* cited by examiner

Primary Examiner—Edward J. Cain

(57) ABSTRACT

Superabsorbent polymers having a slow rate of absorption, and a process for their preparation. The superabsorbent polymer has a slow rate of absorption, is crosslinked with a covalent crosslinking agent and the metal of a polyvalent metal salt and has an Absorption Rate Index of at least about 5 minutes. Such polymers are prepared by contacting a substrate water-swellable, water-insoluble polymer particle with a polyvalent metal salt solution under conditions such that there is formed a polymer having an Absorption Rate Index of at least about 5 minutes.

20 Claims, No Drawings

SUPERABSORBENT POLYMERS HAVING A SLOW RATE OF ABSORPTION

BACKGROUND OF THE INVENTION

This invention relates to superabsorbent polymer (SAP) compositions and a process for preparing said compositions.

Superabsorbent polymers are well-known materials which commonly are used in personal care articles such as diapers. These polymers are known to absorb several times their weight of, for example, water, saline solution, urine, blood, and serous bodily fluids.

The development of increasingly thinner diapers has led to diapers having a high density absorbent core, the core having an increased superabsorbent polymer fraction in the superabsorbent polymer/cellulose fluff mixture. Accordingly, the need to have homogeneous distribution of liquid in the absorbent core is increasingly important in order to fully utilize the highly swellable polymer's storage capacity. However, the distribution of liquid is negatively affected by a reduction in the amount of cellulose fluff in the absorbent core. Thus, additional requirements are now being placed on the highly swellable, liquid-storing polymers in terms of liquid management. The liquid-storing polymers must allow, or support, the distribution of the liquid within the superabsorbent polymer/fluff mix, even in a superabsorbent polymer/fluff mix with a high fraction of highly swellable polymers.

In diapers having a high superabsorbent polymer/fluff ratio, the low fluff content can result in poorer liquid distribution, since the distribution capacity of the fluff is insufficient to compensate for the high absorption rate and absorption capacity of conventional superabsorbent polymers. Accordingly, a very large proportion of body fluid entering a personal care article is absorbed by the superabsorbent polymer in the immediate vicinity of the point of fluid entry.

The swelling of a conventional superabsorbent polymer occurs in such a way that a very high absorption rate is observed immediately after an aqueous liquid is added. After only a few minutes, a highly swellable polymer based on crosslinked, partially neutralized polyacrylate has achieved approximately 95% of its absorption capacity, under conditions of free swelling. This behavior is a typical property of crosslinked polyacrylate superabsorbent polymers.

The rapid expansion of the polymer particles around the point of entry of the body fluid into the area of the absorbent core causes a closing of the interstitial spaces and pores in the SAP-fluff matrix. Since the transport of liquid by diffusion through a swollen hydrogel is much slower than transport through the interstitial spaces, a sealing effect occurs in the area of fluid entry. This effect is often referred to as "gel blocking." Subsequent amounts of fluid can no longer penetrate into the absorbent core and tend to flow in an uncontrolled manner across the surface of the already superficially saturated area to its edge, resulting in undesirable leakage from the absorbent core.

In addition, the storage capacity of the absorbent core decreases, since as a result of the gel blocking of the particles near the surface, the highly swellable polymers embedded deeper in the absorbent core can no longer be reached by subsequent body fluid doses, and hence can not contribute to the total storage capacity.

One approach to the gel blocking problem is to alter the absorption velocity properties of the superabsorbent polymers. For example, U.S. Pat. No. 4,548,847 describes hydrogels reversibly crosslinked by means of at least divalent metal cations, such as $Ca^{+2}$ or $Ba^{+2}$. The patent teaches that a delay in swelling can be accomplished by application of a so-called "cation removal agent." Preferred examples of these are water-soluble compounds such as $Na_2HPO_4$, sodium hexameta-phosphate and the disodium salt of ethylenediaminetetraacetic acid. The effect of these substances is that the reversible crosslinking sites formed by at least divalent metal cations are destroyed by the cation removal agent. With reduced crosslinking density, the product is able to swell more. The patent also describes absorbent articles that contain the absorbent polymers with the delayed swelling feature. An absorbent article built in layers (wound dressing) is described, for instance, in which each layer contains the polymers according to the invention.

GB 2,280,115 A describes an absorbent article that contains coated superabsorbent particles in the area in which body fluids are released. The coating of the superabsorbent particles prevents swelling until the coating has dissolved in the test or body fluid or has been penetrated by it. These are superabsorbent particles that exhibit an activation time until swelling begins, which time can be varied by the coating's material and thickness. Some of the coating materials disclosed are non-reactive polysaccharides such as gelatin, microcrystalline cellulose and cellulose derivatives. The activation period to the start of swelling should be at least 5, preferably 15 and more strongly preferred, 60 minutes.

Coated superabsorbent polymers have the disadvantage that even a small initial wetting, without necessarily leading to the swelling of the highly swellable polymers, leads to a destruction of the surface treatment by dissolution, detachment, swelling or decomposition. Once the coating around the polymers has dissolved, such superabsorbent polymers exhibit the high swelling rate of a conventional material without surface treatment. Thus the desired effect of improved liquid management in the absorbent material is lost.

EP 0 631 768 A1 describes an absorbent article that uses superabsorbent polymers with different absorption velocities. The differences in absorption velocities between the various conventional superabsorbent polymers used arise from different particle size distributions (type 1: 600–850 $\mu m$, type 2: <250 $\mu m$) and are correspondingly small.

U.S. Pat. No. 5,115,011 addresses the gel blocking problem by contacting a water absorbent polymer with an aqueous solution of two water soluble salts, the first being a halogen, sulfate, acetate or nitrate of aluminum, calcium or magnesium, and the second being a monovalent metal salt or ammonium salt of at least one kind of an oxyacid selected from sulfurous acid and thiosulfuric acid. A dry blend of 0.6 g aluminum sulfate and 30 g polymer is prepared in Example for Comparison 3 of the patent, and is shown to have a blocking of 70 percent or more after 5 minutes.

U.S. Pat. No. 5,578,318 discloses the preparation of superabsorbent "hydrophobic coated particles" by dry blending materials, such as non-crosslinked polyacrylate salts, with a source of multivalent ions and, optionally, then adding an alcohol, certain wetting agents, and polysiloxane derivatives. The wetted material is dried prior to use. Example XXIII of this patent discloses a blend of 2.61 weight percent AQUALON A-250, 0.21 weight percent aluminum acetate, and 97.18 weight percent water. After drying, the resulting material of this example exhibited relatively poor performance as a superabsorbent.

U.S. Pat. No. 4,090,013 discloses materials prepared from a water-soluble anionic polyelectrolyte and a polyvalent metal cation source. However, the products are characterized in U.S. Pat. No. 5,578,318 as exhibiting gel blocking.

U.S. Pat. No. 4,693,713 discloses an absorbent for blood and serous bodily fluids, the absorbent comprising a physical mixture of certain polymers and certain compounds. The compounds are described as water soluble, present in the form of a pourable powder at ambient temperature, and not harmful to health. The patent teaches that the compound may be added to the polymer by dissolving it in the monomer solution, or that the compound can be added to the polymer preparation process at any time in dry or dissolved form. Dry blends of polymer and compound are prepared in the examples of the patent.

The problem of gel blocking has been particularly noted in multilayer absorbent articles. One means of solving this problem has been to incorporate slow-rate polymers into the articles. Several means of producing these have been suggested. However, none of these methods produce a totally satisfactory slow-rate polymer.

It would be desirable to have a process for preparing a superabsorbent polymer having a slow rate of absorption which would not require the use of a cation removal agent or a coating for the polymer. One clear advantage of such a process would be the cost savings associated with eliminating the use of the extra materials.

SUMMARY OF THE INVENTION

The present invention includes an improved process for the preparation of superabsorbent polymers having a slow rate of absorption, and the polymers prepared by the process. More specifically, the process is a process for the preparation of water-swellable, water-insoluble polymer particles having a slow rate of water absorption, the process comprising contacting a polyvalent metal salt solution with water-swellable, water-insoluble polymer particles under conditions such that there is formed a polymer having an Absorption Rate Index of at least about 5 minutes. The polymer of the invention is a water-swellable, water-insoluble polymer having a slow rate of absorption, the polymer being cross-linked with a covalent crosslinking agent and the metal of a polyvalent metal salt such that the Absorption Rate Index of the polymer is at least about 5 minutes. In another embodiment, the present invention includes articles containing the slow rate superabsorbent polymer.

DETAILED DESCRIPTION OF THE INVENTION

A preferred process for preparing the improved water-swellable, water-insoluble polymer of the invention involves contacting a covalently crosslinked superabsorbent polymer with a polyvalent metal salt solution under conditions such that there is formed a polymer having an Absorption Rate Index of at least about 5 minutes.

The term "Absorption Rate Index" (ARI) refers to the Absorption Rate Index as measured according to the ARI Test Method described hereinbelow.

In the present invention, a polyvalent metal salt advantageously is employed in an amount sufficient to produce a polymer having an Absorption Rate Index which is at least about 5 minutes. The polyvalent metal salt is preferably water soluble. Examples of preferred metal cations include the cations of Al, Fe, Zr, Mg and Zn. Preferably, the metal cation has a valence of at least +3, with Al being most preferred. Examples of preferred anions in the polyvalent metal salt include halides, chlorohydrates, sulfates, citrates, nitrates and acetates, with chlorides, sulfates, citrates, chlorohydrates and acetates being preferred, citrates, chlorohydrates and sulfates being more preferred, and citrates being most preferred. Highly water soluble salts of aluminum are preferred. Aluminum citrate is the most preferred polyvalent metal salt and is commercially available. Mixtures of polyvalent metal salts can be employed. Preferably, at least 0.003 mole of metal ion per mole of carboxyl groups is employed. More preferably, at least about 0.016 mole of metal ion per mole of carboxyl groups, and most preferably at least about 0.03 mole of metal ion per mole of carboxyl groups, is employed. Preferably, no more than 0.1 mole of metal ion per mole of carboxyl groups is employed based on the weight of the polymer. More preferably, no more than about 0.086 mole of metal ion per mole of carboxyl groups and most preferably no more than 0.07 mole of metal ion per mole of carboxyl groups is employed. Preferably, the amount of polyvalent metal salt employed is from 0.003 to 0.1 mole of metal ion per mole of carboxyl groups. More preferably, from 0.016 to 0.086 mole metal ion per mole of carboxyl groups is employed, and most preferably from 0.03 to 0.07 mole metal ion per mole of carboxyl groups is employed.

The water-swellable, water-insoluble, hydrophilic polymer suitably employable in the present invention can be any hydrophilic polymer which is capable of absorbing large quantities of fluids. These polymers are well known in the art and are widely commercially available. In particular, water-absorbent polymers useful in this invention are water-absorbent polymers which contain carboxyl moieties. Preferably, at least about 0.01 equivalent of carboxyl groups are present per 100 grams of the water-absorbent resin. Among preferred carboxyl-containing water absorbent polymers are hydrolyzates of starch-acrylonitrile graft copolymers, partially neutralized products of starch-acrylic acid or polyvinyl alcohol graft copolymers, saponification products of vinyl acetate acrylic ester copolymers, derivatives of copolymers of isobutylene and maleic anhydride, hydrolyzates of acrylonitrile copolymers, crosslinked products of hydrolyzates of acrylonitrile copolymers, crosslinked carboxymethyl cellulose, polyaspartate hydrolyzates of acrylamide copolymers, crosslinked products of hydrolyzates of acrylamide copolymers, partially neutralized products of polyacrylic acids and crosslinked products of partially neutralized polyacrylic acids. The base polymer for use in this invention suitably has an absorption capacity of from 20 g/g to 50 g/g, although polymers having an absorption capacity outside this range can also be employed.

Examples of some suitable water-swellable, water-insoluble polymers and processes, including gel polymerization processes, for preparing them are disclosed in U.S. Pat. Nos. 3,997,484; 3,926,891; 3,935,099; 4,090,013; 4,093,776; 4,340,706; 4,446,261; 4,683,274; 4,459,396; 4,708,997; 4,076,663; 4,190,562; 4,286,082; 4,857,610; 4,985,518; and 5,145,906, which are incorporated herein by reference. In addition, see Buchholz, F. L. and Graham, A. T., "Modern Superabsorbent Polymer Technology," John Wiley & Sons (1998). Such hydrophilic polymers are prepared from water-soluble $\alpha,\beta$-ethylenically unsaturated monomers such as monocarboxylic acids, polycarboxylic acids, acrylamide and their derivatives.

The contacting of the base polymer with the polyvalent metal salt solution can be conducted in any suitable manner. The contacting conditions are those which are sufficient to produce a polymer having an ARI of at least 5 minutes. The preferred process of the invention involves soaking a superabsorbent polymer in a solution of a polyvalent metal salt.

The soaking time for diffusion of the polyvalent metal salt into the polymer suitably can range from less than 1 hour up to 72 hours or more. It is preferred that the soaking step be at least 1 hour in length. The soaking step may also be conducted for a period of greater than 2 hours, greater than 3 hours, greater than 4 hours, greater than 5 hours, greater than 16 hours, or longer. The temperature at which the gel is maintained during diffusion of the aluminum salt into the polymer suitably is 10° C. to 150° C. The water ratio may range from 1 to 10 parts of water per part of base polymer. Preferably, the contacting of the polymer and polyvalent metal salt is conducted in the substantial absence of a monovalent metal salt or ammonium salt of at least one kind of an oxyacid selected from sulfurous acid and thiosulfuric acid. In a preferred embodiment, the contacting is conducted in the substantial absence of divalent metal salts, and in another preferred embodiment the contacting is conducted in the substantial absence of alcohols. Preferably, the contacting is conducted in the absence of cellulosic fibers, and in the absence of the "cation removal agents" of U.S. Pat. No. 4,548,847, the teachings of which are incorporated herein by reference.

In a preferred process of the invention, the polymer which has been contacted with the solution of polyvalent metal salt preferably is dried following the contacting step. Preferably, the wetted particles are dried at a temperature of at least about 100° C., more preferably at least 120° C. Suitable drying means include fluidized bed driers, rotary driers, forced air ovens and through-circulation band dryers. In some instances, drying can occur in two or more stages, that is, multi-stage drying. Following the completion of drying, the polymer is further sized to form particles preferably having an average diameter less than about 2 mm and more preferably less than about 1 mm. Preferably, the final polymer product has an average particle size of at least 160 microns.

The dried polymer optionally can be heat treated, and the method of heat treatment is not critical. For example, forced air ovens, fluidized bed heaters, heated screw conveyors, and the like may be successfully employed. If desired, the heat-treated polymer may be remoisturized for ease in handling.

Another optional process step is surface cross-linking, which may improve absorptive properties of the polymer particles. Procedures for surface crosslinking are well known in the art and described in, for example, U.S. Pat. Nos. 4,734,478, and 4,666,983, the teachings of which are incorporated herein by reference. These procedures may increase the modulus and/or the absorbency under load of the polymer particles.

The composition of the invention can optionally include other additives such as, for example, anticaking agents. Anticaking agents are well-known. Silica is an example of a preferred anticaking agent.

The composition of the invention exhibits a slow rate of absorbency. Preferably, the composition has an Absorption Rate Index of at least about 5 minutes, more preferably at least about 10 minutes, even more preferably at least about 20 minutes and most preferably at least about 30 minutes. Preferably, the polymer of the invention has reversible cationic crosslinks. Preferably, the polymer of the invention has the metal of the polyvalent metal salt distributed essentially homogeneously distributed throughout the polymer. Preferably, the polymer of the invention is not coated.

The superabsorbent polymers of this invention are useful in the manufacture of moisture absorbent articles, such as disposable diapers, sanitary napkins, incontinence garments and bandages. The superabsorbent compositions of this invention are particularly useful in the manufacture of thin and ultra thin disposable diapers which have excellent moisture absorbence capacity, fluid distribution properties and reduced leakage. For example, the superabsorbent polymers of this invention can be used in the manufacture of absorbent articles such as those described in U.S. Pat. Nos. 3,669,103; 3,670,731; 4,654,039; 4,430,086; 4,973,325; 4,892,598; 4,798,603; 4,500,315; 4,596,567; 4,676,784; 4,938,756; 4,537,590; 4,673,402; 5,061,259; 5,147,343; and 5,149,335; the teachings of which are hereby incorporated by reference. Construction of diapers and other absorbent articles is well known, and materials useful as fluff in absorbent articles are also well known. For the purposes of the present invention, the term "fluff" is given its meaning as understood by those of ordinary skill in the art. Examples of fluff include cotton fibers, curly fibers, wood pulp fibers, synthetic fibers, or a combination thereof, which are formed into a pad and absorb primarily by capillary attraction mechanism. See, e.g., U.S. Pat. No. 4,610,678.

In making absorbent articles with the compositions of this invention, the superabsorbent composition may be mixed with, attached to, layered in, or dispersed in a porous matrix of fibers. Such matrices are made with hydrophilic fibers such as wood pulp or fluff, cotton linters, and synthetic fiber's or a mixture of the fibers and the wood fluff. The fibers can be loose or joined, as in nonwovens. Examples of synthetic fibers include those made using polyethylene, polypropylene, polyesters, and copolymers of polyesters and polyamides. The synthetic fibers may be meltblown fibers or fibers which have been treated to render them hydrophilic.

The superabsorbent polymers of this invention are even more advantageously utilized in absorbent structures that incorporate superabsorbent polymers having a slow absorption rate, either alone or in tandem with superabsorbent polymers having different absorption rates, in multi-compartmentalized or multi-layered structures. Examples of such structures are described in U.S. Pat. Nos. 4,338,371; 4,935,022; 5,364,382; 5,429,629; 5,486,166; 5,520,673; 5,531,728; 5,562,646; and 5,728,082, the teachings of which are incorporated herein by reference.

The superabsorbent polymers of this invention are also advantageously used in those absorbent article manufacturing processes where contact with aqueous fluids is inherent to the process. In these processes, slow absorption rate helps to prevent excessive superabsorbent swelling, which swelling results in large amounts of water to be removed and large volume changes occurring upon drying. Examples of such processes are wet-laid composite processes, and processes for making foam absorbent structures. Examples of wet-laid composite processes are described in U.S. Pat. Nos. 4,354,901; 4,986,882; 5,300,192; 5,308,896; 5,538,783; 5,543,215; 5,795,439 and 5,651,862, the teachings of which are incorporated hereby reference. Examples of foam absorbent structures are described in U.S. Pat. Nos. 4,990,541 and 5,011,864.

Absorbent articles, such as disposable diapers, typically are made with a liquid-impermeable backing material, a liquid-permeable bodyside facing material and the liquid-absorbing composite sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing urine.

The absorbent articles of the invention may comprise from 5 percent to 95 percent by weight of the superabsorbent polymers of the invention. In a typical absorbent article, the superabsorbent polymer of the invention can be dispersed in a fiber matrix; in such an article the superabsorbent advantageously is present in an amount from about 30 to 70 weight percent based on the weight of the article and the fiber matrix is present in an amount of from about 70 to 30 weight percent based on the weight of the article. In another form of absorbent article, the superabsorbent may be present in a containment structure in which the superabsorbent polymer is present in an amount of about 30 to 95 percent by weight. Combinations of dispersed superabsorbent polymer and contained superabsorbent polymer are also known.

The following examples and comparative experiments are given to illustrate the invention and should not be construed as limiting its scope. All parts and percentages are by weight unless otherwise indicated.

SPECIFIC EMBODIMENTS OF THE INVENTION

The absorption capacity (AC) is measured according to the method stated in Buchholz, F. L. and Graham, A. T., "Modern Superabsorbent Polymer Technology," John Wiley & Sons (1998), page 153.

Homogeneous distribution of the metal of the metal salt of the invention in the superabsorbent polymer is measured according to the electron microprobe analysis method as described at Buchholz, F. L. and Graham, A. T., id. at pages 57–58.

ARI Test Method: Method for Determination of the Absorption Rate Index

A 100 mL graduated cylinder is filled with 100 mL of 0.9 wt % aqueous saline solution. A superabsorbent polymer sample is screened to −30/+50 mesh using ASTME-11 specification screens to give a sample having particles in the range of 300 to 600 microns. A 1.00 g portion of the screened polymer is dumped into the graduated cylinder. When the sample first reaches the bottom of the graduated cylinder, a timer accurate to the nearest second is started. The volume of the gel layer is measured at times of 0.5, 1, 2, 3, 4, 5, 6, 8, 10, 15, 30, 60, 90, 180, 330 and 480 minutes. The data is plotted and the time required for the gel volume to reach 60% of its value at 8 hours is determined by interpolation. This time is reported as the t60 time, and for the purposes of the present invention is the "Absorption Rate Index."

EXAMPLE 1

A 100 g sample of superabsorbent polymer is prepared by the process of Example 36 of U.S. Pat. No. 5,629,377 except that 2,200 parts of HE-TMPTA and 8,000 parts of PEG 200 are employed. The polymer has a 1-hour AC of 44 g/g. The polymer is immersed in a solution of 250 grams of water and 10 grams of dissolved aluminum sulfate hydrate ($Al_2(SO_4)_3 \cdot 14\ H_2O$). The resulting gel is covered and allowed to stand at room temperature for 23 hours. The gel is then dried by passing air at 175° C. through the gel for 35 minutes. The dried product is ground in a roll-mill and screened to obtain a maximum particle size of less than approximately 1,000 microns. The resulting product has a 1-hour AC of 27 g/g. The ARI of the ground polymer is determined using the ARI Test Method. The ARI is greater than 10 minutes.

EXAMPLE 2
Use of Aluminum Citrate Solution

The same starting superabsorbent polymer employed in Example 1 (100 parts) is immersed in a solution containing 2.88 parts of citric acid, 7.12 parts of aluminum sulfate ($Al_2(SO_4)_3 \cdot 18\ H_2O$) and 300 parts of water. The resulting gel is allowed to stand at room temperature. The gel is sampled at intervals and the samples are dried by heating in a forced convection oven for 2 hours at 165° C. The dried samples are then ground in a roll-mill and screened to obtain a maximum particle size of less than approximately 1,000 microns. The ARI for varying soak times is shown in the following table.

For comparison purposes, the swell rate of a conventional polymer of similar AC (DRYTECH 2035 brand superabsorbent polymer, available from The Dow Chemical Company) is measured and is included in the following table as Sample #1.

| Sample | Soak time (hr)      | ARI (min) |
|--------|---------------------|-----------|
| 1*     | 0 (DRYTECH 2035)    | <4        |
| 2*     | 0 (Base polymer)    | 4.5       |
| 3      | 0.25                | 7.4       |
| 4      | 1.0                 | 8.2       |
| 5      | 4                   | 10        |
| 6      | 8                   | 14        |

*Not an embodiment of the present invention.

What is claimed is:

1. A process for the preparation of water-swellable, water-insoluble polymer particles having a slow rate of water absorption, the process comprising contacting a polyvalent metal salt solution with water-swellable, water-insoluble polymer particles under conditions such that the metal salt diffuses into the polymer and that there is formed a polymer having an Absorption Rate Index of at least about 5 minutes and having the metal of the metal salt distributed essentially homogeneously in the polymer particles.

2. The process of claim 1 wherein the Absorption Rate Index is at least 10 minutes.

3. The process of claim 1 wherein the Absorption Rate Index is at least 20 minutes.

4. The process of claim 1 wherein the Absorption Rate Index is at least 30 minutes.

5. The process of claim 1 wherein the polymer is partially neutralized polyacrylic acid.

6. The process of claim 1 wherein the metal cation of the polyvalent metal salt has a valence of at least +3.

7. The process of claim 1 wherein the metal cation of the polyvalent metal salt is aluminum.

8. The process of claim 1 wherein the anion of the polyvalent metal salt is selected from the group consisting of citrate and sulphate.

9. The process of claim 1 wherein there is formed a polymer having reversible cationic crosslinks.

10. The process of claim 1 wherein the anion of the salt is sulphate.

11. The process of claim 1 wherein the polymer is formed at least partially from a monomer composition comprising a partially neutralized carboxylic acid.

12. The process of claim 1 wherein the salt is aluminum citrate.

13. The process of claim 1 wherein the anion comprises citrate and sulphate.

14. The process of claim 1 further comprising the step of drying the wetted polymer particles at a temperature of at least 120° C.

15. An absorbent article comprising the polymer prepared by the process of claim 1.

16. The article of claim 15, which is a diaper or part of a diaper wherein the weight ratio of water-swellable, water-insoluble polymer to fluff is at least 0.3.

17. A water-insoluble, water-swellable polymer having an Absorption Rate Index of at least about 5 minutes, the polymer being prepared by the process of claim 1.

18. A water-swellable, water-insoluble polymer having a slow rate of absorption, the polymer being cross-linked with a covalent crosslinking agent and the metal of a polyvalent metal salt such that the Absorption Rate Index of the polymer is at least about 5 minutes, and such that the metal of the metal salt is distributed essentially homogeneously in the polymer.

19. The polymer of claim 18 wherein the polymer is selected from the group consisting essentially of the hydrolyzates of starch-acrylonitrile graft copolymers, partially neutralized products of starch-acrylic acid or starch-polyvinyl alcohol graft copolymers, saponification products of vinyl acetate acrylic esters copolymers, derivatves of copolymers, saponification prducts of vinyl acetate acrylic ester copolymers, derivatives of copolymers of isobutylene and maleic anhydride, hydrolyzates of acrylonitrile carboxymethyl cellulose, hydrolyzates of acrylamide copolymers, and partially neutralized products of polyacrylic acids.

20. The process of claim 1 wherein the polymer is selected from the group consisting essentially of the hydrolyzates of starch-acrylonitrile graft copolymers, partially neutralized products of starch-acrylic acid or starch-polyvinyl alcohol graft copolymers, saponification products of vinyl acetate acrylic esters copolymers, derivatves of copolymers, saponification prducts of vinyl acetate acrylic ester copolymers, derivatives of copolymers of isobutylene and maleic anhydride, hydrolyzates of acrylonitrile carboxymethyl cellulose, hydrolyzates of acrylamide copolymers, and partially neutralized products of polyacrylic acids.

* * * * *